US012697885B2

(12) United States Patent
Sarigiannidis et al.

(10) Patent No.: US 12,697,885 B2
(45) Date of Patent: *Aug. 4, 2026

(54) ADAPTIVE SPEED CONTROL SYSTEM AND METHOD FOR ADAPTING MOTOR CONTROL TO CHANGING LOAD CONDITIONS

(71) Applicant: Nidec Motor Corporation, St. Louis, MO (US)

(72) Inventors: Athanasios Sarigiannidis, Athens (GR); Bo-Ting Lyu, Taipei City (TW); Wei-Chieh Hsu, Taipei City (TW); Shih-Chin Yang, Taipei City (TW)

(73) Assignee: Nidec Motor Corporation, Creve Coeur, MO (US)

( * ) Notice: Subject to any disclaimer, the term of this patent is extended or adjusted under 35 U.S.C. 154(b) by 10 days.

This patent is subject to a terminal disclaimer.

(21) Appl. No.: 19/042,115

(22) Filed: Jan. 31, 2025

(65) Prior Publication Data

US 2025/0170906 A1 May 29, 2025

Related U.S. Application Data

(63) Continuation of application No. 18/158,117, filed on Jan. 23, 2023, now Pat. No. 12,296,688.

(30) Foreign Application Priority Data

Dec. 29, 2022 (GR) .............................. 20220101086

(51) Int. Cl.
*B60L 15/24* (2006.01)

(52) U.S. Cl.
CPC ......... *B60L 15/24* (2013.01); *B60L 2240/421* (2013.01); *B60L 2240/423* (2013.01); *B60L 2240/429* (2013.01); *B60L 2260/42* (2013.01)

(58) Field of Classification Search
CPC .............. B60L 15/24; B60L 2240/421; B60L 2240/423; B60L 2240/429; B60L 2260/42; H02K 1/246; H02K 19/14; H02P 25/092; H02P 27/047; H02P 6/08
See application file for complete search history.

(56) References Cited

U.S. PATENT DOCUMENTS

2013/0057191 A1* 3/2013 Yoshiura ................ G05B 19/19
318/600

* cited by examiner

*Primary Examiner* — Wade Miles
*Assistant Examiner* — Jerrod Irvin Davis
(74) *Attorney, Agent, or Firm* — Hovey Williams LLP

(57) ABSTRACT

An adaptive speed control system and method for adapting control of an electric motor under a changing load condition. A load torque observer determines a load torque value when the motor is operating at a constant speed, and the load torque value is used to adapt a torque. An inertia observer determines an inertia load value when the motor is operating at a changing speed, and the inertia load value is used to adapt a controller gain. An active disturbance input decoupler provides disturbance rejection when the motor is operating at a constant speed. An adaptive control switch switches the load torque observer between driving the inertia observer and driving the active disturbance input decoupler. The system may be configured for a multi-axis system in which multiple motors are each associated with a different axis of motion, and multiple adaptive speed control systems are each associated with a different motor.

17 Claims, 7 Drawing Sheets

Reference model

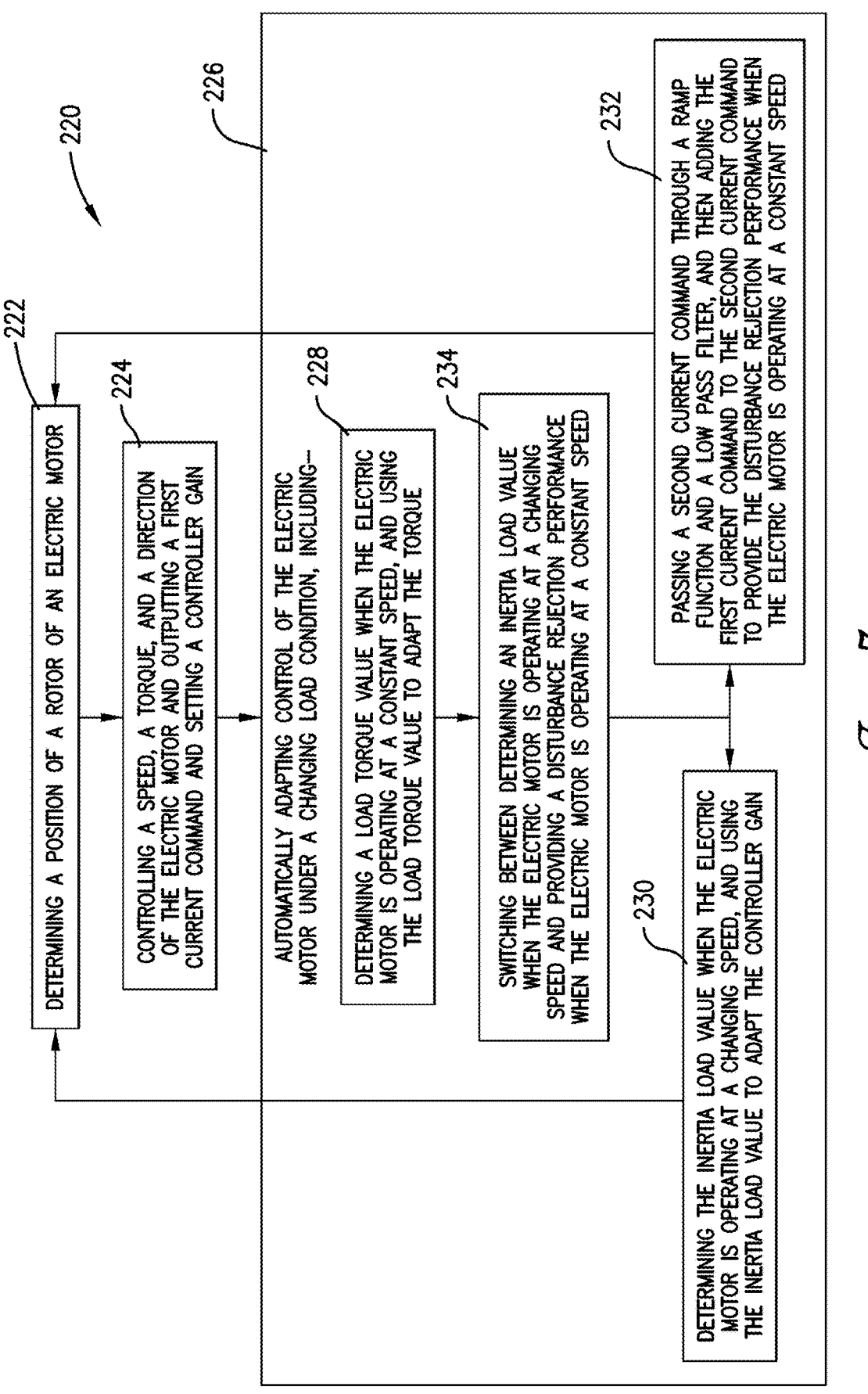

220

222 — DETERMINING A POSITION OF A ROTOR OF AN ELECTRIC MOTOR

224 — CONTROLLING A SPEED, A TORQUE, AND A DIRECTION OF THE ELECTRIC MOTOR AND OUTPUTTING A FIRST CURRENT COMMAND AND SETTING A CONTROLLER GAIN

226 — AUTOMATICALLY ADAPTING CONTROL OF THE ELECTRIC MOTOR UNDER A CHANGING LOAD CONDITION, INCLUDING—

228 — DETERMINING A LOAD TORQUE VALUE WHEN THE ELECTRIC MOTOR IS OPERATING AT A CONSTANT SPEED, AND USING THE LOAD TORQUE VALUE TO ADAPT THE TORQUE

234 — SWITCHING BETWEEN DETERMINING AN INERTIA LOAD VALUE WHEN THE ELECTRIC MOTOR IS OPERATING AT A CHANGING SPEED AND PROVIDING A DISTURBANCE REJECTION PERFORMANCE WHEN THE ELECTRIC MOTOR IS OPERATING AT A CONSTANT SPEED

230 — DETERMINING THE INERTIA LOAD VALUE WHEN THE ELECTRIC MOTOR IS OPERATING AT A CHANGING SPEED, AND USING THE INERTIA LOAD VALUE TO ADAPT THE CONTROLLER GAIN

232 — PASSING A SECOND CURRENT COMMAND THROUGH A RAMP FUNCTION AND A LOW PASS FILTER, AND THEN ADDING THE FIRST CURRENT COMMAND TO THE SECOND CURRENT COMMAND TO PROVIDE THE DISTURBANCE REJECTION PERFORMANCE WHEN THE ELECTRIC MOTOR IS OPERATING AT A CONSTANT SPEED

*Fig. 7.*

ADAPTIVE SPEED CONTROL SYSTEM AND METHOD FOR ADAPTING MOTOR CONTROL TO CHANGING LOAD CONDITIONS

CROSS REFERENCE TO RELATED APPLICATIONS

The present U.S. non-provisional patent application is a continuation and claims priority benefit of an earlier-filed U.S. non-provisional patent application with the same title, Ser. No. 18/158,117, filed Jan. 23, 2023, and an even earlier-filed Greek patent application, Serial No. 20220101086, filed Dec. 29, 2022. The entire contents of the identified earlier-filed patent applications are incorporated by reference as if fully set forth herein.

FIELD

The present invention relates to systems and methods for controlling electric motors, and more particularly, embodiments provide an adaptive speed control system and method for automatically adapting control of an electric motor under changing load conditions.

BACKGROUND

In servomotor speed control, fixed gain proportional-integral-derivative (PID) controllers may not be able to maintain consistent performance under complex load conditions. Generally, loads can take the form of external load torque due to gravity and/or inertia due to payload. External load torque is the real torque acting against the actuator output, and it can change unpredictably and significantly during operation. Inertia involves the mass of the system excluding the motor and actuator, and it does not change quickly or significantly during operation. To maintain consistent performance, it is desirable to adjust the control of the motor when a load changes. Without adjustment, the system may overperform under no or low loads and underperform under high loads. Although adaptive control theory is known and used in, for example, aerospace applications, the required structural complexity and huge computational load of existing solutions make them impractical for industrial real-time applications.

This background discussion is intended to provide information related to the present invention which is not necessarily prior art.

SUMMARY

Embodiments address the above-described problems and limitations in the prior art by providing an adaptive speed control system and method for automatically adapting control of an electric motor under changing load conditions. In particular, embodiments advantageously provide a less complex and computationally intensive adaptive mechanism than prior art solutions.

A first embodiment of an electric motor system may include an electric motor, a motor speed controller, a motor angle sensor, and an adaptive speed control system. The electric motor may include a stator and a rotor, and the motor angle sensor may determine a position of the rotor. The motor speed controller may control a speed, a torque, and a direction of the electric motor and output a first current command and set a controller gain. The adaptive speed control system may automatically adapt control of the electric motor under a changing load condition, and may include a load torque observer and an active disturbance input decoupler. The load torque observer may determine a load torque value due to the changing load condition when the electric motor is operating at a constant speed, and the load torque value may be used by the motor speed controller to adapt the torque. The active disturbance input decoupler may be driven by the load torque observer and process a second current command by passing the second current command through a ramp function and a low pass filter, and then add the first current command from the speed controller to the second current command from the decoupler to provide a disturbance rejection in response to a rapidly changing load condition affecting the load torque value when the electric motor is operating at the constant speed.

A second embodiment of the electric motor system may include an electric motor, a motor angle sensor, a motor speed controller, and an adaptive speed control system. The electric motor may include a stator and a rotor, and the motor angle sensor may determine a position of the rotor. The motor speed controller may control a speed, a torque, and a direction of the electric motor and output a first current command and set a controller gain. The adaptive speed control system may automatically adapt control of the electric motor under a changing load condition, and may include a load torque observer, an inertia observer, and an active disturbance input decoupler. The load torque observer may determine a load torque value when the electric motor is operating at a constant speed, and the load torque value may be used by the motor speed controller to adapt the torque. The inertia observer may be driven by the load torque observer and determine an inertia load value when the electric motor is operating at a changing speed, and the inertia load value may be used by the motor speed controller to adapt the controller gain. The active disturbance input decoupler may be driven by the load torque observer and may process a second current command by passing the second current command through a ramp function and a low pass filter, and then add the first current command to the second current command to provide a disturbance rejection in response to a rapidly changing load condition affecting the load torque value when the electric motor is operating at the constant speed.

In various implementations, the embodiments of the electric motor system described above may include any one or more of the following additional or alternative features. The motor angle sensor may be an encoder or a position sensor. The motor speed controller may be a proportional-integral controller. The load torque observer may determine the load torque value as a function of a motor current, a motor torque which is calculated from the motor current, the position of the rotor, a motor speed which is calculated from the position of the rotor, and a command output from the motor speed controller. The inertia observer may determine the inertia load value as an integral of the external load multiplied with an observer gain and added to an initial inertia value provided by a user. The system may further include a plurality of the electric motors, with each electric motor being associated with a different axis of motion, and a plurality of the adaptive speed control systems, and with each adaptive speed control system being associated with a different electric motor.

An embodiment of a method of automatically adapting control of an electric motor may include the following steps. A position of a rotor of the electric motor may be determined. A speed, a torque, and a direction of the electric motor may be controlled and a first current command may be output and a controller gain may be set. A load torque due to a changing load value may be determined when the electric motor is operating at a constant speed, and the load torque value may be used to adapt the torque. An inertia load value may be determined when the electric motor is operating at a changing speed, and the inertia load value may be used to adapt the controller gain. A second current command may be passed through a ramp function and a low pass filter, and then the first current command may be added to the second current command to provide a disturbance rejection in response to a rapidly changing load condition affecting the load torque value when electric motor is operating at the constant speed. The process of determining the inertia load value when the electric motor is operating at a changing speed and providing the disturbance rejection performance when the electric motor is operating at a constant speed may be switched between.

In an implementation of the method described above, the method may further include automatically adapting control of a plurality of the electric motors under changing load conditions, with each electric motor being associated with a different axis of motion, and each with step of the method being performed for each electric motor.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 7 is a flowchart of an embodiment of a method for adaptive speed control for automatically adapting control of an electric motor under changing load conditions.

Figure 1:
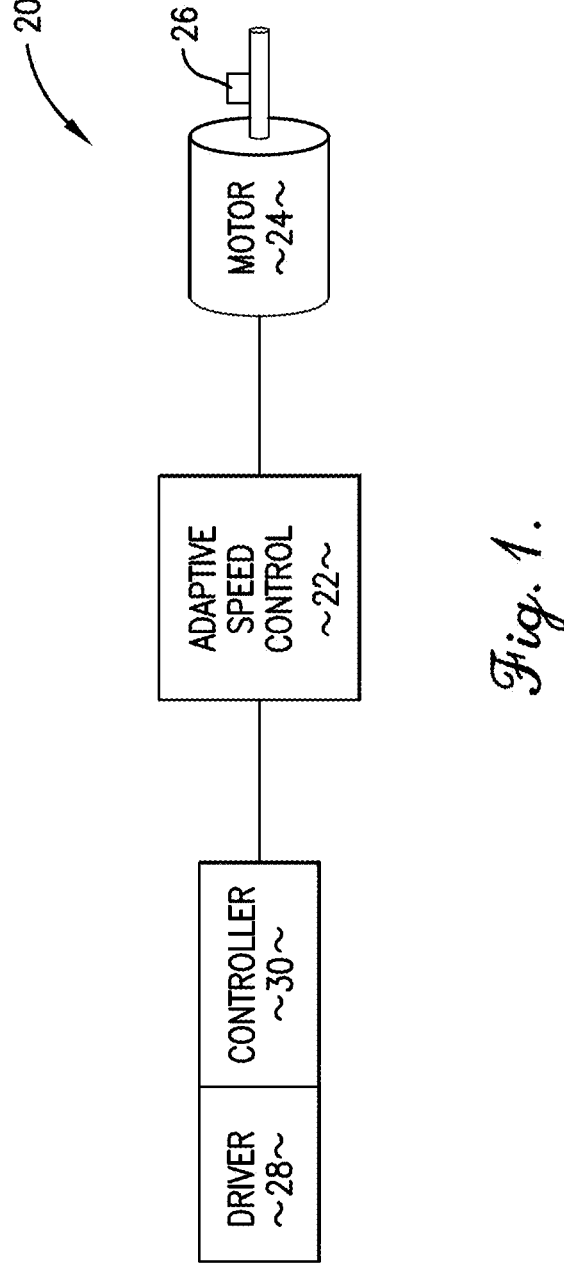
FIG. 1 is a block diagram of an embodiment of a system including an adaptive speed control system for automatically adapting control of an electric motor under changing load conditions.
Figure 2:
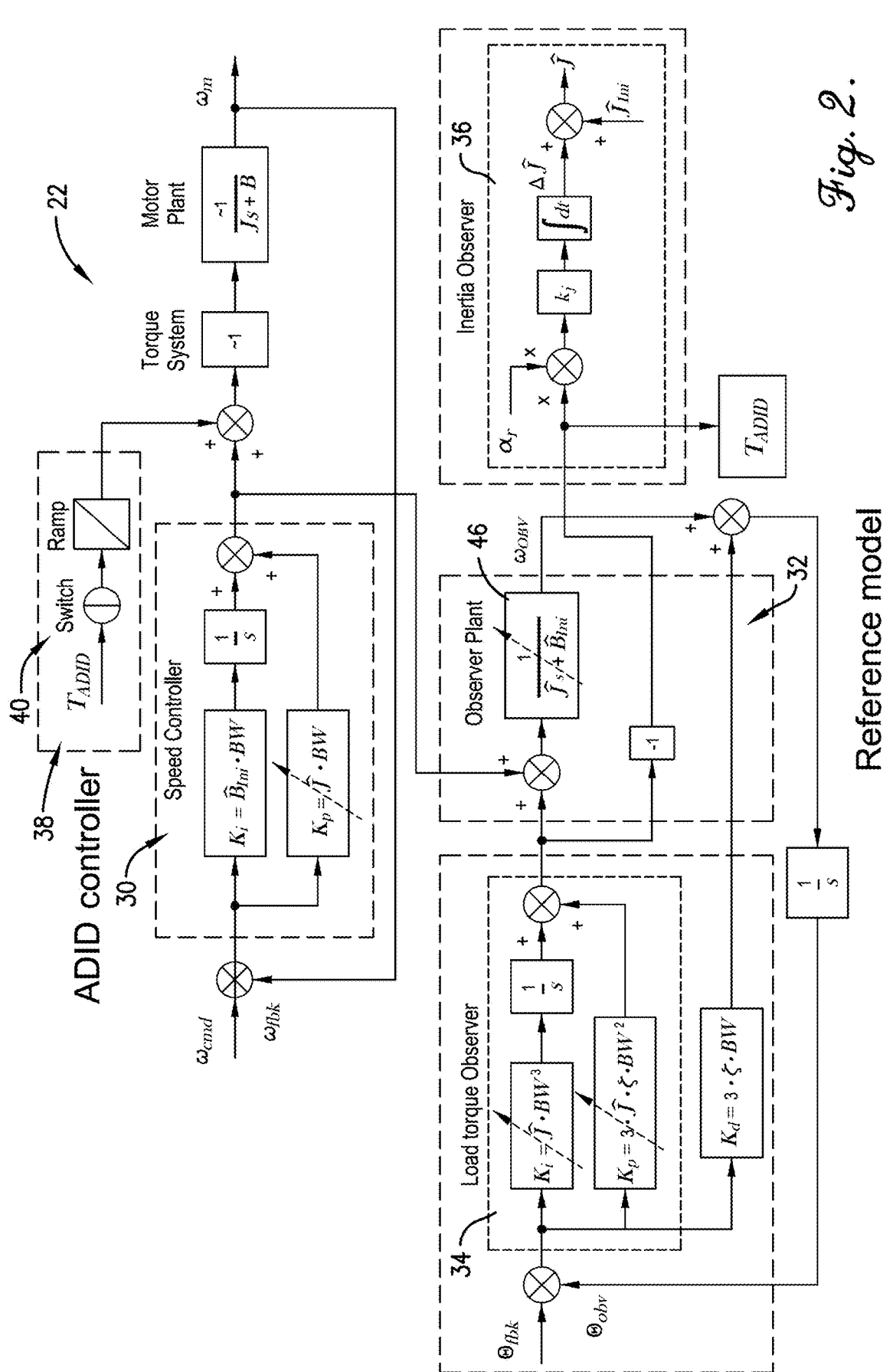
FIG. 2 is a block diagram of an embodiment of the adaptive speed control system of FIG. 1.
Figure 3:
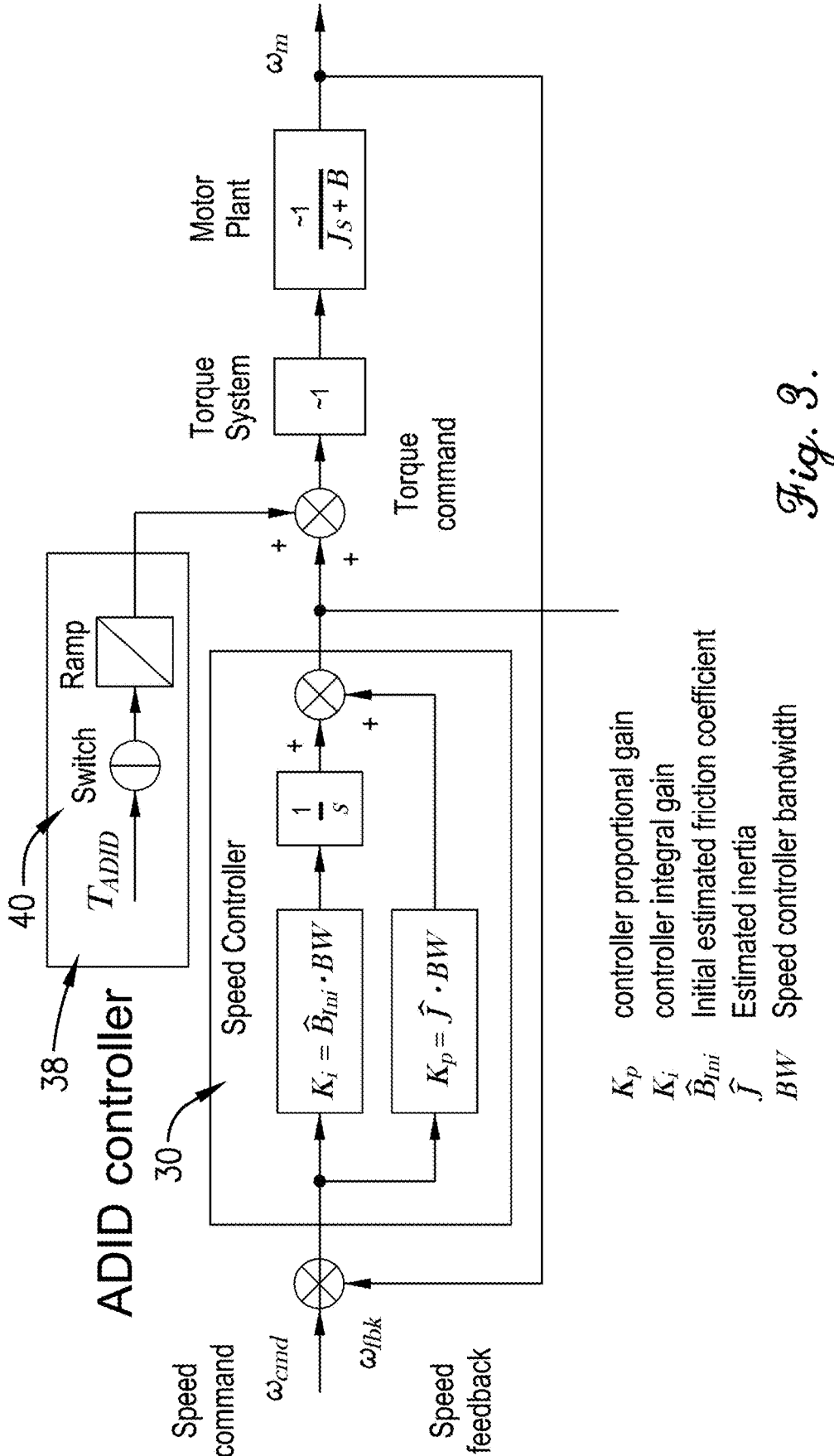
FIG. 3 is a block diagram of a speed controller component of the system of FIG. 1 and an active disturbance input decoupler component of the adaptive speed control system of FIG. 2.
Figure 4:
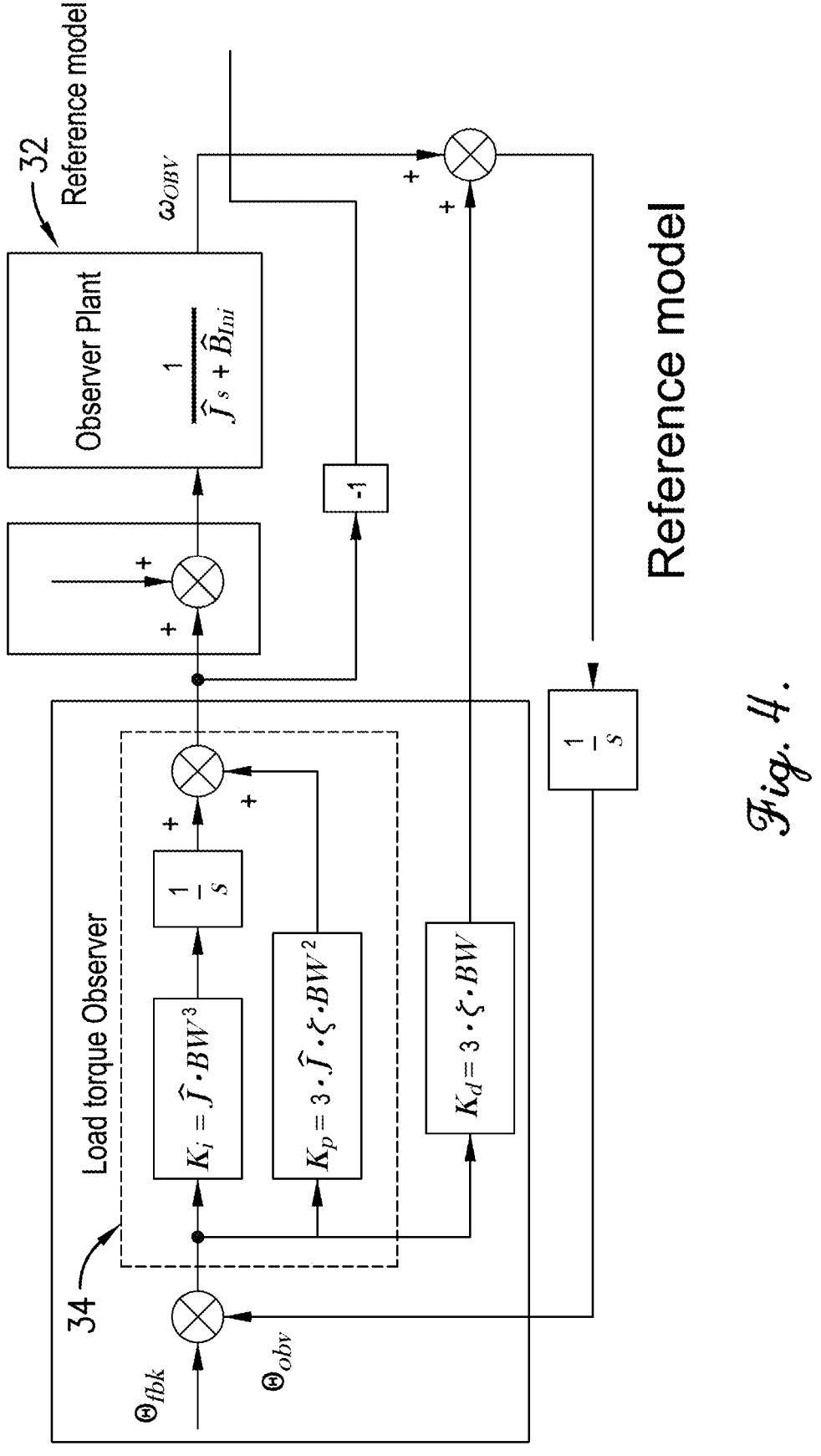
FIG. 4 is a block diagram of a reference model component and a load torque observer component of the adaptive speed control system of FIG. 2.
Figure 5:
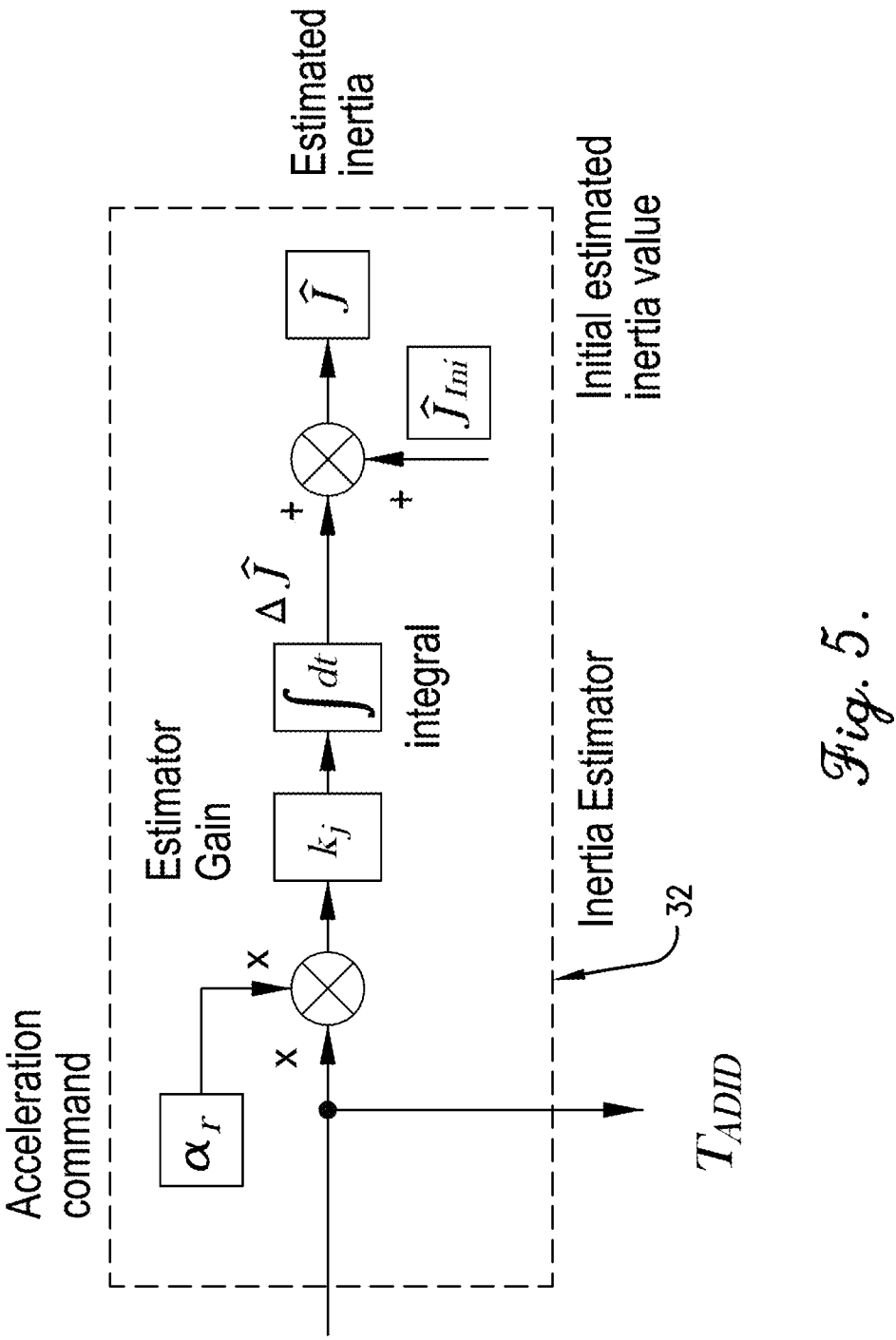
FIG. 5 is a block diagram of an inertia observer component of the adaptive speed control system of FIG. 2.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly, embodiments provide an adaptive speed control system and method for automatically adapting control of an electric motor under changing load conditions. The characteristics of an electric motor system may change under different operating conditions, and embodiments advantageously improve performance by detecting changes in load and adjusting controller parameters to compensate. In one embodiment, a load torque observer may determine a load torque value when the motor is operating at a constant speed, and the load torque value may be used to adapt a torque. An inertia observer may determine an inertia load value when the motor is operating at a changing speed, and the inertia load value may be used to adapt a controller gain. An active disturbance input decoupler may provide a disturbance rejection in response to a rapidly changing load condition affecting the load torque value when the electric motor is operating at the constant speed. An adaptive control switch may switch the load torque observer between driving the inertia observer and driving the active disturbance input decoupler. Additionally, the system may be configured for multi-axis motion in which multiple motors are each associated with a different axis of motion, and multiple adaptive speed control systems are each associated with a different motor.

Changing load conditions on an electric motor system can take the form of an external load torque due to gravity and/or the form of an inertia load due to payload. Changing external load torque is detected under constant speed, while changing inertia is detected under changing speed (acceleration or deceleration). Embodiments of the adaptive speed control system and method advantageously automatically adapt control of the electric motor to compensate for changes in one or both types of loads. Further, disturbance rejection under the constant speed region is limited by the controller gain, so embodiments advantageously include disturbance input decoupling which directly compensates the external load torque by adding the compensation value to the stator current command to improve performance. In particular, because the bandwidth of the load torque observer may be higher than the bandwidth of the speed controller, the disturbance input decoupling can provide faster response than the speed controller for compensating the load torque, resulting in less speed drop and quicker recovery when the load is added under constant speed command operation. Additionally, because a change in external load torque and a change in inertia load cannot be detected and compensated simultaneously, embodiments advantageously provide a switch mechanism for switching between detecting and compensating for the two types of loads. Additionally, in a multi-axis system the load is ideally but not necessarily equally distributed across the multiple axes, and a multi-axis embodiment advantageously provides adaptive speed control for each axis of motion.

Referring to FIGS. 1-6, an electric motor system 20 is shown including an embodiment of an adaptive speed control system 22 for automatically adapting control of an electric motor 24 under changing load conditions. The system 20 may include the electric motor 24, a motor angle sensor 26, a motor driver 28, a motor speed controller 30, and the adaptive speed control system 22. The electric motor 24 may be substantially any suitable electric motor, such as a servomotor, which is useable with and can benefit from the present invention. The motor 24 may include a stator and a rotor. The motor angle sensor 26 may be configured to determine a position of the rotor, and may be substantially any suitable motor angle sensor, such as an encoder or position sensor, which commonly would be provided on or with the motor 24. The motor driver 30 may be substantially any suitable motor driver, such as a low cost programmable commercial servomotor driver, configured to provide electrical power to the motor 24 and to provide motor speed/position feedback and motor current feedback control.

The speed controller 30 may be substantially any suitable speed controller configured to control the speed, torque, and direction of the motor 24 and to set a controller gain and output a first current command. The controller gain may be based on the principle of pole-zero cancelation, in which case the controller proportional gain may be derived as follows: Kp=Control Bandwidth (rad/s)*System Inertia (kg-m^2), and the controller integral gain may be derived as follows: Ki=Control Bandwidth (rad/s)*System Friction (Nm/rad/s). However, because the system inertia is detected and adjusted during operation, the controller gain may be re-derived as follows: Kp=Control Bandwidth (rad/s)*Estimated Inertia (kg-m^2), and Ki=Control Bandwidth (rad/s) *Initial Friction (Nm/rad/s).

Referring particularly to FIGS. 2-6, the adaptive speed control system 22 may be configured to automatically adapt control of the electric motor 24, including adjusting the controller gain, under changing load conditions, and may include a mechanical reference model 32, a load torque observer 34, an inertia observer 36, an active disturbance input decoupler (ADID) 38, and an adaptive control switch mechanism 40.

The mechanical reference model 32 may be derived as 1/(J_est*s+B_ini), where J_est is the estimated system inertia, and B_ini is the initial system friction coefficient designated by user. The input of the reference model may be the sum of the output of the load torque observer and the output of the speed controller 30. External load torque and inertia load both present as load torque in a reference model, but they can be distinguished by based on the steady state, or constant speed, and transient state, or changing speed. When the motor is under constant speed operation, only an applied external load torque will cause speed variation. Under this steady state condition, all load torque detected by the reference model is seen as external load torque. When the motor is under changing speed operation, the load torque detected by the reference model is seen as an inertia error between the real world inertia and reference model inertia. The reference model 32 may include a PI regulator and a virtual observer plant 46. The observer plant 46 may take the rotor position (or motor angle) as original input and electric torque as feedforward input. Because the observer plant 46 attempts to generate the true system torque to follow the motor trajectory, the output of the PI regulator may compensate for the difference between total torque and electric torque, which is the system load torque.

The load torque observer 34 may be configured to detect and compensate for the error torque between the motor torque and the required torque of the reference model 32. Therefore, the error torque, or load torque, may be the inertia error or the external load torque. Because there may be no external sensor except the motor angle sensor 26 and the motor driver 28 itself, the input to the load torque observer 34 may include the following: the motor current, the motor torque which is calculated from the current, the rotor position, the motor speed which is calculated from the rotor position, and the first current command and other outputs of the speed controller 30.

The load may present as external inertia and true load torque, so the estimated load torque, $\hat{T}_L$, may be derived as shown in Equation (1):

$$\hat{T}_L = \frac{K_d s^2 + K_p s + K_i}{\hat{J}^3 + K_d s^2 + K_p s + K_i}(\Delta J\alpha_r + \Delta B\omega_r + T_L) \tag{1}$$

wherein
$\Delta J$, is the inertia error;
$\Delta B$ is the friction error;
$\alpha_r$ is the motor acceleration rate;
$\omega_r$ is the motor speed; and
$T_L$ is the "true" external load torque.

However, with only rotor position feedback, it may be difficult to divide the terms caused by inertia and friction errors $(\Delta J\alpha_r+\Delta B\omega_r)$ and the true load torque $T_L$. To simplify the problem, the source may be assumed to be only the inertia error term derived as shown in Equation (2):

$$\hat{T}_L = \frac{K_d s^2 + K_p s + K_i}{\hat{J}^3 + K_d s^2 + K_p s + K_i}(\Delta J\cdot\alpha_r) \tag{2}$$

The entire estimated load torque may be seen as the inertia error result.

The inertia observer 36 may be configured to detect and compensate for the inertia load. When the error torque (load torque) from the load torque observer 34 is considered as the inertia error, the estimated inertia may be the integral of the load torque multiplied by the observer gain, Kj, and added with an initial inertia value specified by the user. From Equation (2), above, it can be assumed that all estimated load torque, $\hat{T}_L$, is considered to be the error between the observer plant inertia and the real system inertia. The inertia observer 36 is derived as shown in Equations (3) and (4), in which the updated inertia, $\hat{J}_{est}$, is the initial set inertia, $\hat{J}_{ini}$, added to the integral of the estimated load torque, $\Delta\hat{J}$. After the new system inertia is calculated, the controller gain, Kp, may be updated according to Equation (5), wherein, $BW_{ctl}$, is the bandwidth setting of the speed controller 30, which is a fixed value.

$$\frac{dJ_{est}}{dt} = -K_j \cdot \hat{T}_L \cdot \left(\frac{\partial \hat{T}_L}{\partial \hat{J}}\right) = K_j \cdot \hat{T}_L \cdot \alpha_r \tag{3}$$

$$\hat{J}_{est} = \hat{J}_{ini} + \Delta\hat{J} = \hat{J}_{ini} + \int (K_j \cdot \hat{T}_L \cdot \alpha_r) dt \tag{4}$$

$$K_P = \hat{J}_{est} \cdot BW_{ctl} \tag{5}$$

Because the acceleration command, $\alpha_r$, is included to update system inertia, the controller gain may be updated only when the motor 24 is accelerating or decelerating.

The ADID 38 may be configured to improve the distur- bance rejection performance during constant speed opera- tion. A second current command from the ADID 38 may be processed by passing the second current command through a ramp function and a low pass filter, and then the processed second current command from the ADID 38 may be added to the first current command from the speed controller 30 to provide a disturbance rejection performance when the elec- tric motor 24 is operating at a constant speed.

According to Equation (4), above, the controller gain may not be updated under constant speed command operation. However, load torque may be added abruptly, causing a sudden drop in motor speed. The ability to resist the unpre- dictable and fast-acting load torque is referred to as "dis- turbance rejection performance." In a conventional PI con- trol system, the integral term will work to stop the motor speed from dropping continuously and then recover the speed to the command value, but it requires time to accu- mulate sufficient error to drive the recovery. Therefore, the performance is limited to the speed control loop bandwidth. The ADID 38 directly utilizes the load torque observer 34 when the motor 24 is under constant speed operation. Because there is no effect on acceleration error during constant speed operation, the total estimated load torque can be consider to be the "real load torque" and can be directly compensated to the torque command. Otherwise, because the ADID 38 works independent of the speed controller 30, it can provide quicker response and higher accuracy for the disturbance rejection operation as higher bandwidth values can be achieved compared to the speed loop PI controller.

The adaptive control switch mechanism 40 may separate the operations of the load torque observer 34. The output of the load torque observer 34 performs at least two operations: First, it drives the inertia observer 36 to update the speed controller, Kp, gain, and second, it drives the ADID 38 to directly compensate for the load. If these two operations occur at the same time, the stability of the system may be negatively impacted. The switch mechanism 40 avoids this by separating the two operations. In one implementation, there may be at least three operational conditions as follows. In a first command transient condition, the motor speed command is not a constant value, only the inertia observer 36 is enabled to adapt the controller gain, Kp, and the ADID 38 is disabled. In a second command steady, loop error unsteady condition, the motor speed command becomes a constant value, and the inertia observer 36 stops working because there is no acceleration, but the loop error has not yet converged so the ADID 38 remains disabled. In a third command steady, loop error steady condition, the speed loop error converges under a set value (for example, five percent), the ADID 38 is enabled and begins direct compensation, while the inertia observer 36 is still disabled.

From the foregoing, it will be understood that the load torque observer 34 may be involved in adjusting for both types of loads, while the inertia observer 36 may be involved only in adjusting for inertia loads. The system 22 may adjust for torque when dealing with constant speed external load torque and adjust for controller gain when dealing with changing speed inertia load. The adaptive control switch mechanism 40 switches from compensating for one load type to the other. The ADID 38 provides an advantage in compensating for rapidly changing external load torque, so if it is not desirable or possible to compensate for inertia (that is, the inertia observer is inactive or eliminated from the system 22), the system 34 may retain the ADID 38 and eliminate the switch mechanism 40 so that the ADID 38 is always on.

Figure 6:
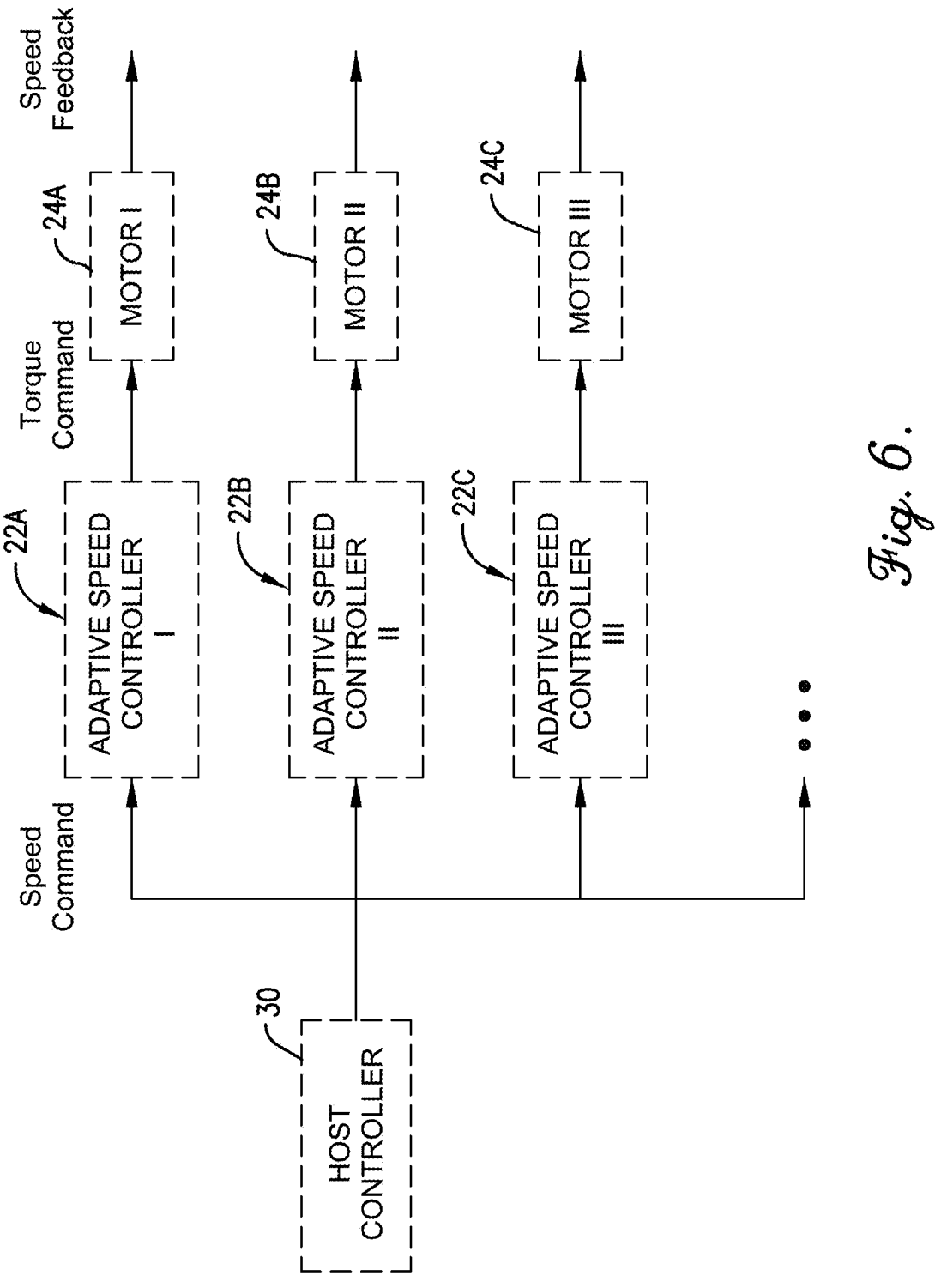
FIG. 6 is a block diagram of a multi-axis implementation of the adaptive speed control system of FIG. 2.

Referring particularly to FIG. 6, the adaptive speed con- trol system can be implemented for single- or multi-axis control (refer to FIG. 4), wherein a plurality of the systems 22A,22B,22C may be used in multi-axis control, with each system being associated with a different axis and motor 24A,24B,24C.

Referring also to FIG. 7, an embodiment of a method 220 of automatically adapting control of the electric motor 24 is shown. The method 220 may be implemented using com- ponents of the system 20 described above. Similarly, the method 220 may reflect operation of the system 20.

A position of a rotor of the electric motor may be determined, as shown in 220. The position of the rotor may be determined using a motor angle sensor 26, such as an encoder or a position sensor. A speed, a torque, and a direction of the electric motor may be controlled and a first current command may be output and a controller gain may be set, as shown in 224. These functions may be performed by a motor speed controller 30, which may be a propor- tional-integral controller.

Control of the electric motor may be automatically adapted under a changing load condition, as shown in 226. Adapting control of the electric motor may be performed by an adaptive speed control system 22, and may include the following. A load torque value may be determined when the electric motor is operating at a constant speed, and the load torque value may be used to adapt the torque, as shown in 228. Determining the load torque value may be performed by a load torque observer 34. In one implementation, determining the load torque value may be based, at least in part, on input such as a motor current, a motor torque which is calculated from the motor current, the position of the rotor, a motor speed which is calculated from the position of the rotor, and the first current command output from the motor speed controller.

An inertia load value may be determined when the electric motor is operating at a changing speed, and the inertia load value may be used to adapt the controller gain, as shown in 230. Determining the inertia load value may be driven by the load torque observer 34 and may be performed by an inertia observer 36. In one implementation, the inertia load may be determined as an integral of the external load multiplied with an observer gain and added to an initial inertia value provided by a user.

A second current command from an ADID 38 may be processed by passing the second current command through a ramp function and a low pass filter, and then the processed second current command from the ADID 38 may be added to the first current command from the speed controller 30 to provide a disturbance rejection performance when the elec- tric motor 24 is operating at a constant speed, as shown in 232. Providing the disturbance rejection performance may be driven by the load torque observer 34 and performed by an active disturbance input decoupler 38.

The method 220 may further include switching between determining the inertia load value (that is, driving the inertia observer) when the electric motor is operating at a changing speed and providing the disturbance rejection performance (that is, driving the active disturbance input decoupler) when the electric motor is operating at a constant speed, as shown in 234. This switching may be performed by an adaptive control switch 40. The method 220 may further include automatically adapting control of a plurality of the electric motors under changing load conditions, with each electric motor being associated with a different axis of motion, and each step of the method being performed for each electric motor.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system comprising:
an electric motor;
a motor speed controller controlling a speed, a torque, and a direction of the electric motor and outputting a first current command; and
an adaptive speed control system automatically adapting control of the electric motor under a changing load condition, the adaptive speed control system including
a load torque observer determining a load torque value due to the changing load condition when the electric motor is operating at a constant speed, and
an active disturbance input decoupler driven by the load torque observer and processing a second current command and then adding the first current command to the second current command to provide a disturbance rejection in response to a rapidly changing load condition affecting the load torque value when the electric motor is operating at a constant speed.

2. The system of claim 1, wherein the electric motor is a servomotor.

3. The system of claim 1, wherein the motor includes a rotor and a motor angle sensor, wherein the motor angle sensor determines a position of the rotor and the motor angle sensor is selected from the group consisting of: encoders and position sensors.

4. The system of claim 1, wherein the motor speed controller is a proportional-integral controller.

5. The system of claim 1, wherein the motor includes a rotor, the load torque value is used by the motor speed controller to adapt the torque, and the load torque observer determines the load torque value as a function of a motor current, a motor torque which is calculated from the motor current, a position of the rotor, a motor speed which is calculated from the position of the rotor, and the first current command from the motor speed controller.

6. The system of claim 1, wherein the motor speed controller sets a controller gain, and the system further includes an inertia observer driven by the load torque observer and determining an inertia load value due to the changing load condition when the electric motor is operating at a changing speed, wherein the inertia load value is used by the motor speed controller to adapt the controller gain.

7. The system of claim 6, wherein the inertia observer determines the inertia load as an integral of an external load multiplied with an observer gain and added to an initial inertia value provided by a user.

8. The system of claim 6, wherein the active disturbance decoupler further includes an adaptive control switch switching the load torque observer between driving the inertia observer when the electric motor is operating at a changing speed and driving the active disturbance input decoupler when the electric motor is operating at a constant speed.

9. The system of claim 1, further including
a plurality of the electric motors, with each electric motor being associated with a different axis of motion; and
a plurality of the adaptive speed control systems, with each adaptive speed control system being associated with a different electric motor.

10. An electric motor system comprising:
an electric motor;
a motor speed controller controlling a speed, a torque, and a direction of the electric motor and outputting a first current command and setting a controller gain; and
an adaptive speed control system for automatically adapting control of the electric motor under a changing load condition, the adaptive speed control system comprising
a load torque observer determining a load torque value due to the changing load condition when the electric motor is operating at a constant speed, wherein the load torque value is used by the motor speed controller to adapt the torque,
an inertia observer driven by the load torque observer and determining an inertia load value due to the changing load condition when the electric motor is operating at a changing speed, wherein the inertia load value is used by the motor speed controller to adapt the controller gain, and
an active disturbance input decoupler driven by the load torque observer and processing a second current command and then adding the first current command to the second current command to provide a disturbance rejection in response to a rapidly changing load condition affecting the load torque value when electric motor is operating at a constant speed.

11. The electric motor system of claim 10, wherein the motor includes a rotor, and the load torque observer determines the load torque value as a function of a motor current, a motor torque which is calculated from the motor current, a position of the rotor, a motor speed which is calculated from the position of the rotor, and the first current command from the motor speed controller.

12. The electric motor system of claim 10, wherein the inertia observer determines the inertia load as an integral of an external load multiplied with an observer gain and added to an initial inertia value provided by a user.

13. The electric motor system of claim 10, wherein the active disturbance decoupler further includes an adaptive control switch switching the load torque observer between driving the inertia observer when the electric motor is operating at a changing speed and driving the active disturbance input decoupler when the electric motor is operating at a constant speed.

14. The electric motor system of claim 10, further including
a plurality of the electric motors, with each electric motor being associated with a different axis of motion; and
a plurality of the adaptive speed control systems, with each adaptive speed control system being associated with a different electric motor.

15. The electric motor system of claim 10, wherein the electric motor is a servomotor.

16. A method comprising:
controlling a speed, a torque, and a direction of an electric motor and outputting a first current command;
adapting control of the electric motor under a changing load condition, including
determining a load torque value due to a changing load condition when the electric motor is operating at a constant speed,
processing a second current command, and
adding the first current command to a second current command to provide a disturbance rejection in response to a rapidly changing load condition affecting the load torque value when the electric motor is operating at a constant speed.

17. The method of claim 16, further including automatically adapting control of a plurality of the electric motors under changing load conditions, with each electric motor being associated with a different axis of motion, and each step of the method being performed for each electric motor.

* * * * *